Figure 1:
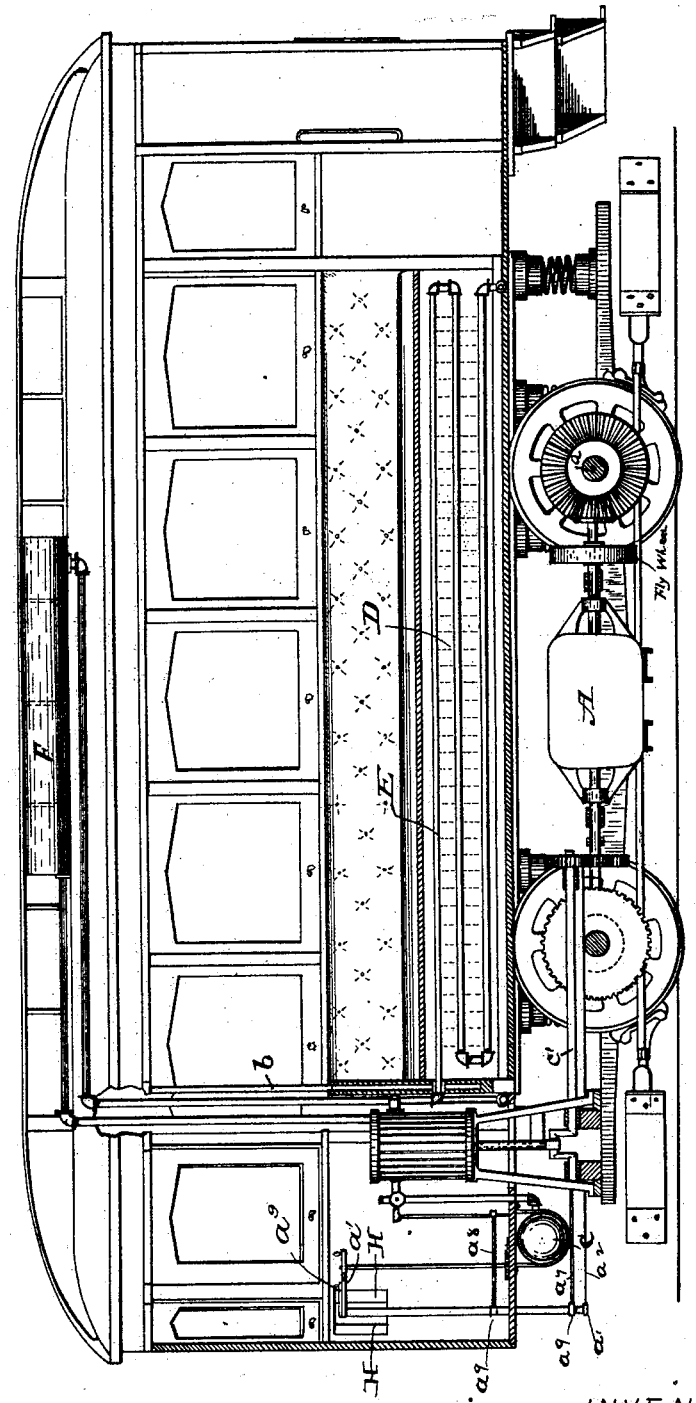

(No Model.) 4 Sheets—Sheet 1.

G. A. WASHBURN.
SELF PROPELLING VEHICLE, BOAT, &c.

No. 550,008. Patented Nov. 19, 1895.

WITNESSES
Alfred J. Symes Jr
Addie Pishek

INVENTOR
George A. Washburn
By N. S. Amstutz
Attorney (No Model.) 4 Sheets—Sheet 2.

G. A. WASHBURN.
SELF PROPELLING VEHICLE, BOAT, &c.

No. 550,008. Patented Nov. 19, 1895.

WITNESSES
INVENTOR
George A. Washburn
By N. S. Amstutz
Attorney (No Model.) 4 Sheets—Sheet 3.

G. A. WASHBURN.
SELF PROPELLING VEHICLE, BOAT, &c.

No. 550,008. Patented Nov. 19, 1895.

WITNESSES
Alfred J. Symes Jr.
Addie Pishek.

INVENTOR
George A. Washburn
By N. S. Amstutz
Attorney (No Model.) 4 Sheets—Sheet 4.
G. A. WASHBURN.
SELF PROPELLING VEHICLE, BOAT, &c.
No. 550,008. Patented Nov. 19, 1895.
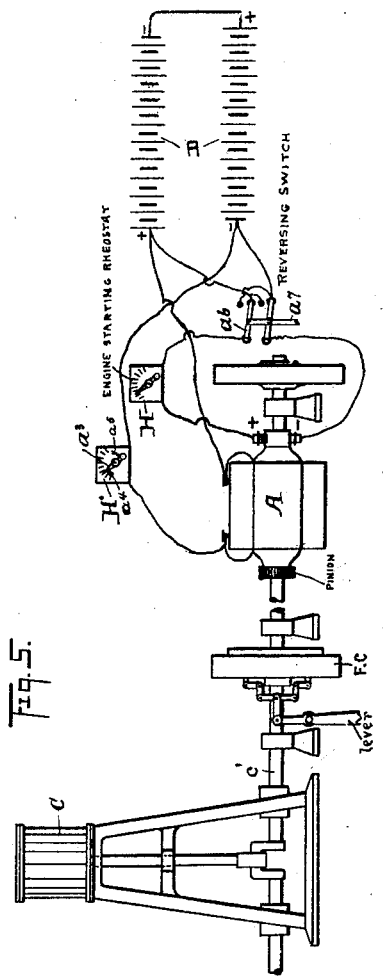
WITNESSES
Belle L. Lowrie.
S. G. Nottingham.
George A. Washburn INVENTOR
By
N. S. Amstutz ATTORNEY.

UNITED STATES PATENT OFFICE.

GEORGE A. WASHBURN, OF CLEVELAND, OHIO.

SELF-PROPELLING VEHICLE, BOAT, &c.

SPECIFICATION forming part of Letters Patent No. 550,008, dated November 19, 1895.

Application filed March 6, 1895. Serial No. 540,724. (No model.)

*To all whom it may concern:*

Be it known that I, GEORGE A. WASHBURN, a citizen of the United States, residing at Cleveland, in the county of Cuyahoga and State of Ohio, have invented certain new and useful Improvements in Self-Propelling Vehicles, Boats, &c.; and I do hereby declare the following to be a full, clear, and exact description of the invention, such as will enable others skilled in the art to which it appertains to make and use the same.

My invention relates to an improvement in a combined motive power and electric generating and storing apparatus for the propulsion of movable conveyances and analogous power purposes.

The object of my invention is to provide a system of propulsion, in which may be employed an engine or prime mover of minimum weight and capacity, which will serve to rotate or assist in rotating the driving shaft or axle, and also and at the same time serve to operate a dynamo-electric machine and generate electric energy, which is stored in an accumulator, the parts to be so combined and arranged that the energy thus stored in the accumulator will be drawn upon and utilized in rotating or assisting in rotating the driving shaft or axle by the automatic transformation of the dynamo into an electric motor whenever the electromotive force of the accumulator exceeds the opposing electromotive force of the dynamo.

As one embodiment of my invention I employ a gas-engine or any suitable motive power as the prime mover and connect it mechanically with a dynamo-motor to operate the same. So long as the demand for power does not reach the maximum capacity of the engine, the dynamo-motor operates and serves as an electric generator and generates and delivers more or less current to an electric accumulator. Whenever the demand for power exceeds the maximum capacity of the prime mover the dynamo-motor ceases to operate as an electric generator and the electric energy stored in the accumulator automatically operates the dynamo-motor as an electric motor, which latter then assists the prime mover, the current delivered by the accumulator to the dynamo-motor being automatically proportioned to the demand for power in excess of the capacity of the prime mover.

Any suitable reversing-switch and controller are employed in connection with the dynamo-motor and accumulator for the purpose of operating the dynamo-motor in opposite directions and for controlling the dynamo-motor for emergencies. However, under normal conditions, the relation of parts are such that the entire system is automatic.

The term "dynamo-motor" is used to designate a machine which may serve the twofold purpose of an electric generator and an electric motor.

Figure 2:
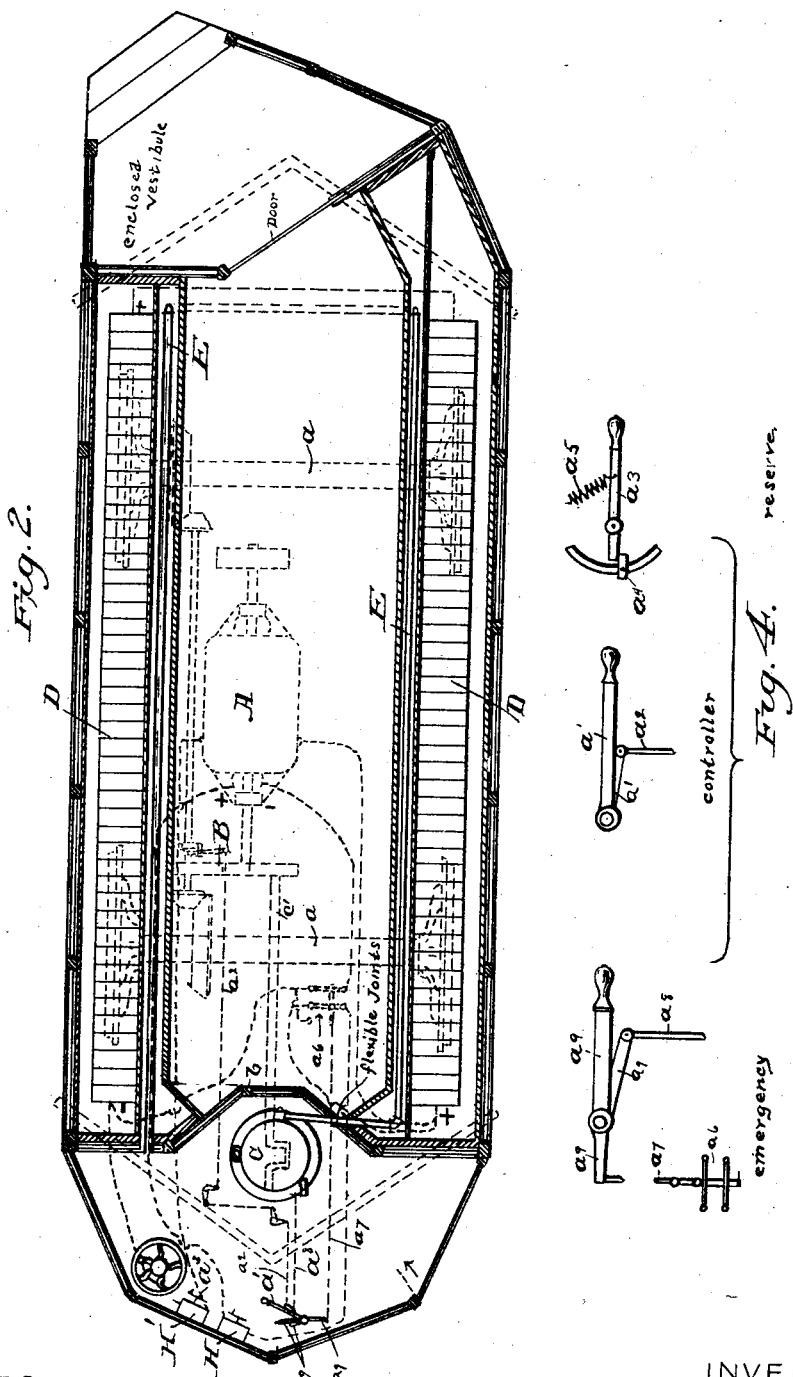
Figure 3:
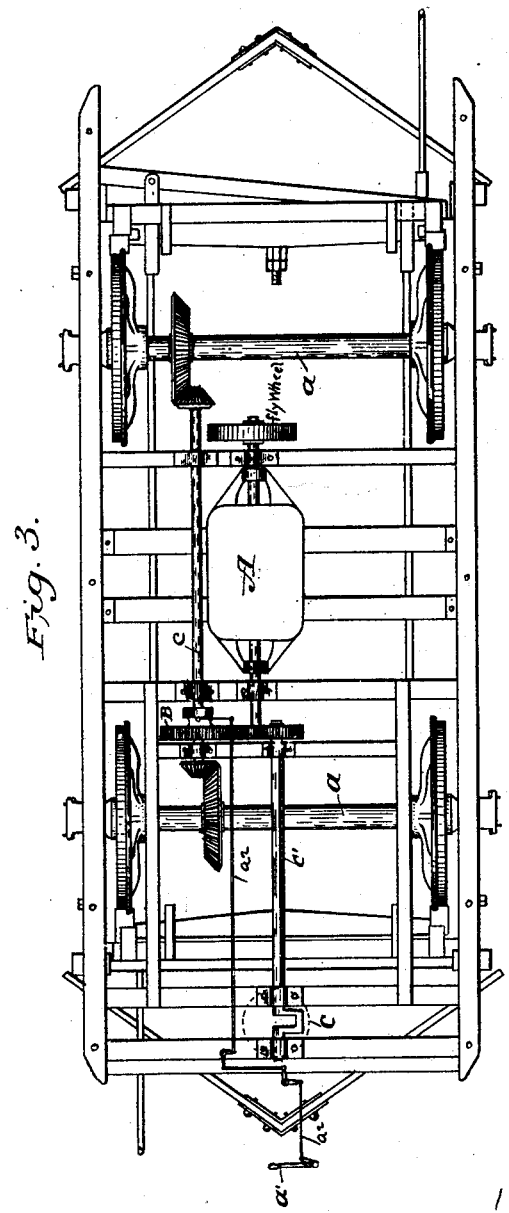

In the accompanying drawings, Figure 1 is a side elevation, partly in vertical section of a vehicle provided with the invention. Fig. 2 is a plan view. Fig. 3 is a plan view of the car-truck and power connections. Fig. 4 is a plan view of the several controlling-levers, and Fig. 5 is a diagrammatic view of the circuit connections.

Upon any suitable truck or movable conveyance is suitably mounted a dynamo-motor A, the armature-shaft of which is connected to the car-axles $a$ through suitable intervening gearing and the shaft $c$. A clutch B, or similar connecting and disconnecting mechanism, is placed on the shaft $c$ between the dynamo-motor A and the car-axle $a$, and is actuated and controlled by a hand-lever $a'$ and connecting-rod $a^2$, whereby the car may be started or stopped at will.

The dynamo-motor A is mechanically connected to a gas or other engine $c$ through a shaft $c'$, which may be kept in constant rotation under normal conditions of operation. The shaft $c$ is provided with a friction-clutch F' for connecting and disconnecting the prime mover and dynamo-motor. An electric accumulator D is electrically connected through suitable rheostats or controllers H and H', and reversing-switch $a^6$ with the dynamo-motor A. The adjustable rheostat H', which is controlled by a handle $a^3$ and stop $a^4$, and included in the charging-circuit of the accumulator, may be adjusted, so as to regulate and predetermine the amount of current that shall be delivered to the accumulator under varying conditions of charging by regulating the strength of the current flowing in the field-circuit of the dynamo-motor.

An emergency lever $a^9$ and connecting-rods $a^7$ and $a^8$ are provided for simultaneously closing the throttle-valve of the prime mover C and actuating the reversing-switch $a^6$ to quickly stop and reverse the direction of the car or other conveyance. The air compression in the cylinder of the prime mover assists very materially in quickly stopping the car for reversing its movement. In the event the car is to be propelled to any distance rearwardly, then the relief-valves of the prime mover should be opened, provided the prime mover is not disconnected through the medium of the clutch F'.

Water-tanks F may be placed upon the roof of the car and connected with a water-jacket encircling the cylinder of the prime mover to cool it, as is done in ordinary practice.

The car-body may be of any desired design, sufficient space being allowed at the front end to form a vestibule for the motorman, and also to provide a space, as at $b$, sufficient in size to accommodate the cylinder of the prime mover without encroaching upon the seating-capacity of the car.

A suitable fuel-tank C' may be provided as a receptacle for gasoline, compressed gas, or other available fuel.

The operation of my improvement is as follows: In starting the prime mover, the accumulator D being charged and open-circuited, the rheostat H, which is included in the charging-circuit, is first moved into the position of highest resistance, as in ordinary electric-motor practice, and then, by means of the switch $a^6$ or any ordinary means, the dynamo-motor is switched into the circuit of the accumulator and is operated as an electric motor by the current supplied thereto by the accumulator, which results in putting the prime mover into action upon moving the clutch F', so as to connect the prime mover and dynamo-motor. It will thus be observed that the dynamo-motor is utilized in starting the prime mover, which is then in condition, in the event a gas-engine is employed, for imparting power by the explosion of the charges in the cylinder which have been compressed therein by the action of the dynamo-motor. When the prime mover has been started, as above set forth, the car is started and its movement is controlled through the medium of the friction-clutch B, which on being "set up" solid will cause the car to be propelled at its maximum speed, while the clutch, on being slightly loosened, will operate to reduce the speed of the car, and when entirely disengaged the car can be stopped by suitable brake mechanism. When the car slows up or stops, the prime mover ordinarily continues in motion, and its entire available power is then utilized in generating and storing electric energy. Upon starting the car in the same direction by means of the friction-clutch B, the speed of the prime mover will be reduced, owing to the increased load imposed upon it. Consequently the opposing electromotive force of the dynamo-motor falls below the electromotive force of the accumulator D, thereby causing the latter to discharge its current into the dynamo-motor and operate it as an electric motor to assist the prime mover in operating the car. If for any reason the combined power of the prime mover and electric motor is insufficient to move the car, the rheostat H' in the field-circuit of the dynamo-motor is adjusted so as to strengthen the field of the dynamo-motor, so as to cause it to impart its maximum power in assisting the prime mover. As soon as the car has attained sufficient headway, the rheostat-lever as it is released is moved back to its normal position by the spring $a^5$. As the speed of the car increases, the opposing electromotive force of the dynamo-motor rises, and hence the current flowing through it from the accumulator is correspondingly diminished. When the opposing electromotive force of the dynamo-motor is the same, or is equal to the electromotive force of the accumulator, then no current will flow in either direction between the accumulator and the dynamo-motor, and the latter then is in readiness at any instant to store any surplus power of the engine in the form of electrical energy in the accumulator, and to utilize such stored energy as it may be needed in assisting the prime mover.

As has been explained, my improved system is inherently automatic in its operation, surplus power being automatically stored and then utilized whenever and to the extent that it may be needed to operate the driving-shaft or axle with the variable loads that may be imposed thereon. Ordinarily the prime mover must be sufficiently large and powerful to supply power sufficient to operate the driving-shaft or axle when subjected to its maximum load; but in my system I am enabled to employ a prime mover only slightly larger and more powerful than is needed to operate the driving axle or shaft when its average load is imposed thereon, because of the fact that the reserve power in the form of stored energy very largely increases the available power that the system is capable of supplying. In descending grades the dynamo-motor may serve the two-fold purpose of retarding the speed of the car or train and also of utilizing the momentum of the car or train in operating it, and thereby storing the power resulting from the momentum of the car.

While my invention is primarily intended for use in connection with movable conveyances, it will be clearly evident that it is well adapted for use in connection with stationary power installations in which the available power in variable, or in which the load is variable and is sometimes in excess of and at other times is less than the maximum load which can be operated by the available power. Hence I do not restrict my invention to its application to movable conveyances.

It is evident that the type, construction, and relative arrangement of the prime mover, dynamo-motor, accumulator, controller, and the other parts of my system might be widely varied without departing from the spirit and scope of my invention, and hence I would have it understood that I do not limit myself to the particular construction and arrangement of parts shown and described; but, Having fully described my invention, what I claim as new, and desire to secure by Letters Patent, is—

1. The combination with a driving axle or shaft and a prime mover for rotating the same, of a dynamo-motor connected with and adapted to be driven by the prime mover, means for connecting and disconnecting the dynamo-motor and driving axle or shaft independent of the prime-mover, an electric accumulator arranged and adapted to have electric energy stored therein by the dynamo-motor and means for automatically actuating the dynamo-motor as an electric motor by the energy stored in the accumulator to independently rotate or to assist in rotating the driving axle or shaft, substantially as set forth.

2. The combination with a driving shaft or axle and a prime-mover for rotating or assisting in rotating the same, of a dynamo-motor, connected with the prime-mover and with the driving axle or shaft, means for connecting and disconnecting the dynamo-motor and driving shaft, and an electric-accumulator connected with the dynamo-motor so as to be charged thereby, the electrical connections being such that when the electromotive force of the accumulator is greater than the electromotive force of the dynamo-motor the latter will be automatically transformed into an electric motor and will be adapted either alone or in conjunction with the prime-mover to rotate the driving shaft, substantially as set forth.

3. The combination with a driving axle or shaft and a prime-mover for rotating or assisting in rotating the same, of a dynamo-motor connected with and adapted to be driven by the prime-mover and also connected with and adapted to rotate the driving axle independently of the prime-mover or in conjunction therewith, and an electric-accumulator adapted to have electric energy stored therein by the dynamo-motor while operating as an electric generator, and to expend such stored energy in operating the dynamo-motor as an electric-motor to rotate or assist in rotating the driving axle or shaft, the transformation of the dynamo-motor into a generator or a motor being solely due to and automatically effected by the relative electromotive force of the accumulator and the opposing electromotive force of the dynamo-motor, substantially as set forth.

4. The combination with the driving shaft or axle of a movable conveyance, of a prime-mover, a dynamo-motor and means for connecting the prime-mover and dynamo-motor, with and disconnecting them from the driving shaft or axle, and an electric-accumulator connected with the dynamo-motor so that the dynamo-motor is automatically transformed into and serves either as an electric generator or electric motor according as the electromotive force of the accumulator is less or greater than the opposing electromotive force of the dynamo-motor, substantially as set forth.

5. The combination with the driving shaft or axle of a movable conveyance, of a prime mover, a dynamo-motor and means for connecting the prime mover with the driving shaft or axle, and for connecting and disconnecting the dynamo-motor and driving axle or shaft, so that the prime mover may simultaneously actuate the dynamo-motor and driving shaft, and also so that the prime mover and dynamo-motor may simultaneously actuate the driving shaft or axle, and an electric accumulator connected with the dynamo-motor, the connections and arrangement being such that the transformation of the dynamo-motor into a generator or motor is automatically effected by and is due to the relative electromotive force of the accumulator and opposing electromotive force of the dynamo-motor, substantially as set forth.

6. The combination with the driving shaft or axle of a movable conveyance, of a prime mover the speed of which varies with the load imposed upon the driving shaft or axle, a dynamo-motor means for connecting and disconnecting the dynamo-motor and driving axle or shaft and means for simultaneously transmitting the power of the prime mover to the driving shaft or axle and the dynamo-motor, of an electric accumulator, and means for transmitting the energy stored therein through the dynamo-motor to the driving axle or shaft, the connections and arrangement of parts being such that the dynamo-motor is automatically transformed into either a generator or motor solely by the relative electromotive force of the accumulator as compared with the opposing electromotive force of the dynamo-motor, substantially as set forth.

7. The combination with the driving shaft or axle of a movable conveyance, of a dynamo-motor, a prime mover, the latter being arranged and connected to simultaneously actuate both the dynamo-motor and the driving shaft, means for connecting and disconnecting the dynamo-motor and driving axle or shaft, of an electric accumulator, and suitable mechanism and connections whereby the energy stored in the accumulator may be utilized in actuating the driving shaft directly by the dynamo-motor and independently of the prime mover, substantially as set forth.

8. The combination with the driving shaft or axle of a movable conveyance and a prime mover, of a dynamo-motor adapted to operate in opposite directions either as a generator or as a motor, an electric accumulator and reversing switch, the connections and arrangement of parts being such that the prime mover may rotate the driving shaft or axle and also the dynamo-motor in either direction and cause the latter to store electrical energy in the accumulator, which energy may be utilized in operating the dynamo-motor in either direction as a motor, substantially as set forth.

9. The combination with the driving shaft or axle of a movable conveyance, of a prime mover, a dynamo-motor, and means for connecting and disconnecting the prime mover and dynamo-motor and means for throwing the prime mover and dynamo motor into or out of engagement with the driving shaft or axle, substantially as set forth.

10. The combination of a prime mover and a dynamo-motor, an electric accumulator, electric connections between said dynamo-motor and the accumulator, with a circuit controlling device interposed in such circuit, a valve or other means for controlling the fuel supply to the prime mover, and means for simultaneously reversing the current supply to the said dynamo-motor and closing the fuel supply to the prime mover, substantially as set forth.

11. The combination with the driving axle or shaft of a movable conveyance, a prime mover, a dynamo-motor, means for throwing the prime mover and dynamo-motor into and out of engagement with the driving axle or shaft, an electric accumulator and suitable switch and controlling devices in circuit therewith whereby the dynamo-motor may be actuated to operate the prime mover, substantially as set forth.

12. The combination with an axle or shaft to be driven, of a dynamo-motor, a prime mover, and means whereby the power of the prime mover may be transmitted to the dynamo-motor alone, or simultaneously to the dynamo-motor and the driving axle or shaft, substantially as set forth.

In testimony whereof I affix my signature in presence of two witnesses.

GEORGE A. WASHBURN.

Witnesses:
 N. S. AMSTUTZ,
 T. A. MCCASLIN.